May 13, 1930.  B. M. JENSEN  1,758,364
FISHING TOOL
Filed Oct. 24, 1927   2 Sheets-Sheet 1
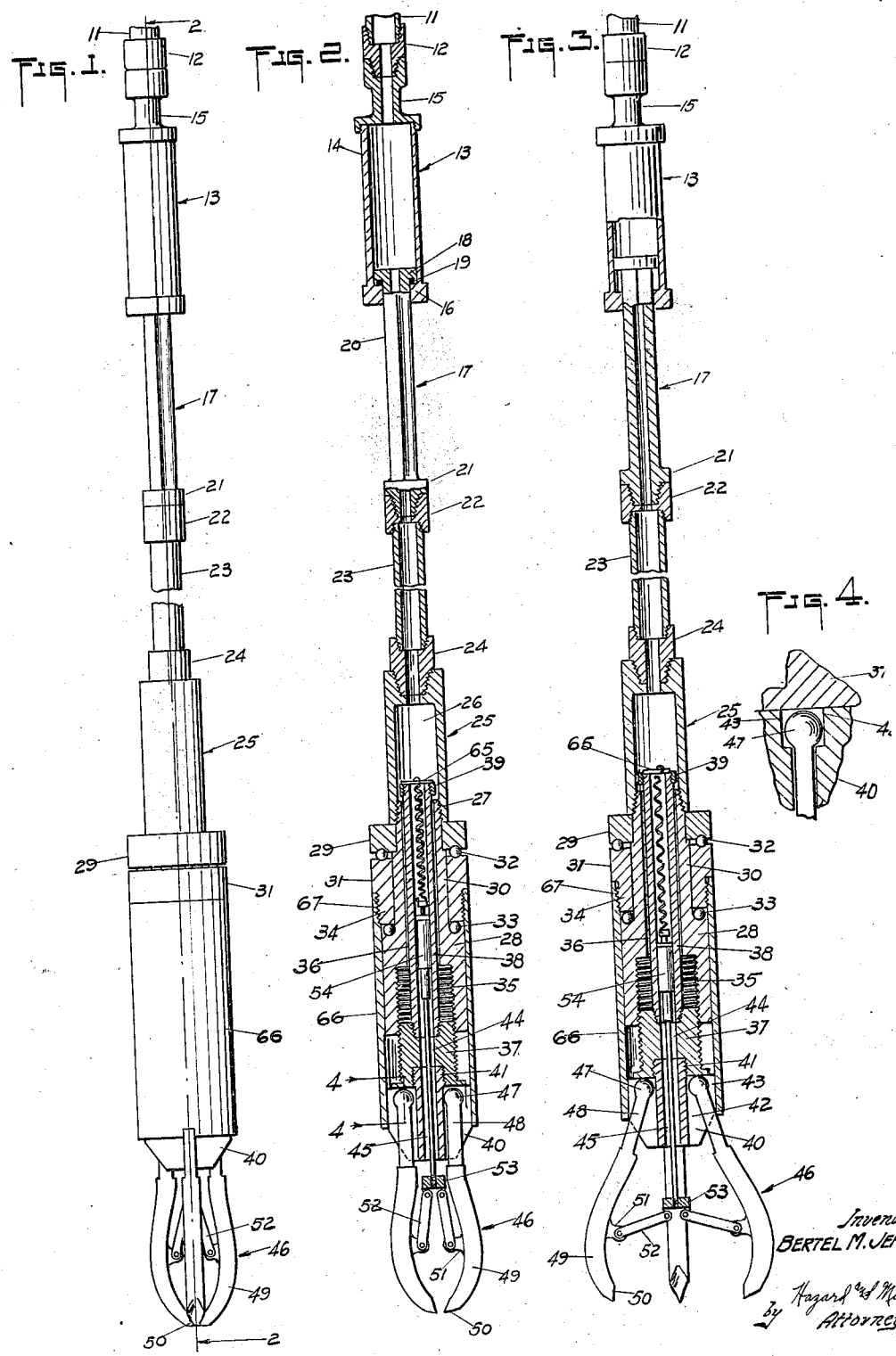
Inventor
BERTEL M. JENSEN.
by Hazard & Miller
Attorneys.

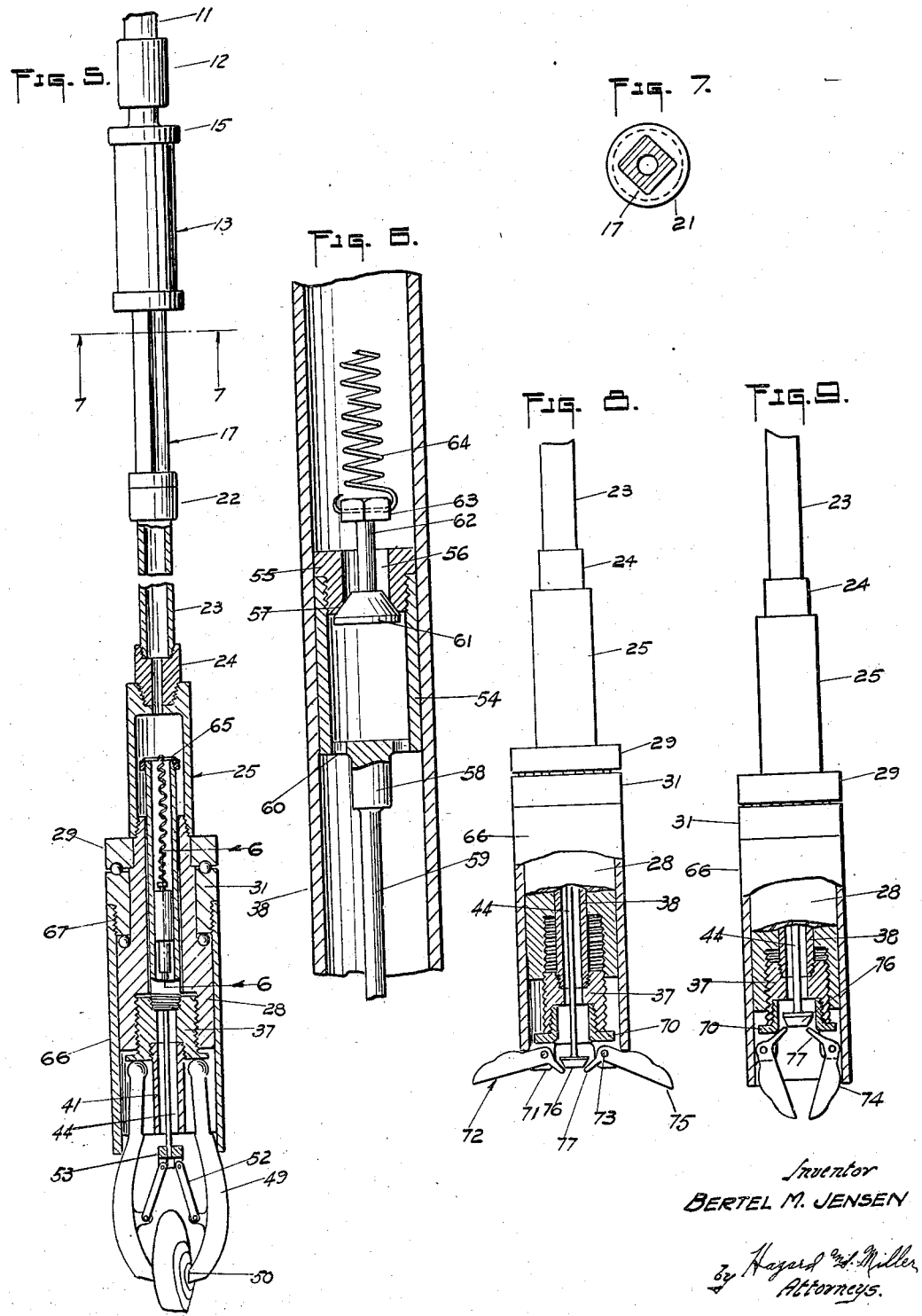

Patented May 13, 1930

1,758,364

UNITED STATES PATENT OFFICE

BERTEL M. JENSEN, OF REDONDO BEACH, CALIFORNIA

FISHING TOOL

Application filed October 24, 1927. Serial No. 228,267.

My invention is a fishing tool for deep well work.

An object of my invention is the introduction of the gripping elements of the fishing tool into a well in the collapsed position, and, in addition, a hydraulically operated arrangement for spreading said elements apart, due to the action of a slushing fluid, such fluid being discharged around the gripping elements, maintaining them clean and washing the mud, and the like, away from the fish to be lifted.

Another object of my invention is collapsing the gripping elements by a rotary action of the fishing tool, and when the fish is gripped, the jaws or gripping elements being held firmly in engagement with the fish and lifting same to the top of the well.

A more particular object of my invention is a differential type of action in spreading the jaws or gripping elements, whereby the initial hydraulic pressure spreads the jaws apart after introduction into the well, and a further increase of pressure passes the slushing fluid outwardly through the lower end of the fishing tool.

Another object of my invention is providing a telescopic support for the fishing tool so that the weight of the rods and the like, leading from the tool to the top of the well, will not bear on the jaws, but pipe inserts may be utilized to give a sufficient weight on the jaws if desired.

A further object of my invention is having a ball bearing joint between the foot element of the tool having the jaws connected thereto, and the upper part of the tool, to allow action of a sleeve in squeezing in the jaws on the turning movement of the upper part of the fishing tool.

In constructing my invention I have a series of pipes connected from the top of the well. These terminate in a telescopic coupling, the inner member of which is shaped to prevent rotation, such as being squared. This inner part is connected by a coupling to inserted pipes which may be utilized to give weight, and these pipes connect into a coupling which is attached to a relatively large pipe, forming a compression fluid chamber. This latter pipe is interiorly connected to a foot member which has an internally threaded socket in which fits a shoe plug, this being threaded therein, the shoe plug having jaws pivotally connected thereto. The shoe plug and foot have a longitudinal passageway in alignment and a pipe is connected on the upper end of the shoe sliding in the passage in the foot. A valve is slidably mounted in this latter pipe.

The valve comprises a valve casing with ports at the top and bottom, and a valve plug, closing the upper port. The valve plug is connected by a spring to the upper end of the pipe, which extends through the passage in the foot, such pipe being slidable in the foot. A rod extends from the lower end of the valve casing and is connected by toggle levers at its lower end to the pivotally mounted jaws, and is utilized by forcing slushing fluid through the carrier pipe into the pipe forming the compression chamber. This operates against the valve casing and bodily moves the casing until the valve plug is opened, when the casing remains in its lowered position and with the jaws spread apart, these jaws being contracted in lowering the fishing tool into the well.

To close the jaws a sleeve is connected to a rotatable collar operating between a fixed abutment collar and the foot. The operation of rotating slushing fluid pipes causes the relative rotation of the foot and the shoe, the jaws on the shoe being in engagement with the fish, and forces the sleeve downwardly, thereby contracting the jaws and gripping the fish for removal to the surface of a well.

My invention will be more readily understood from the following description and drawings, in which:

Figure 1 is a side elevation of my fishing tool.

Fig. 2 is a vertical section taken substantially on the line 2—2 of Fig. 1 in the direction of the arrows, certain of the interior parts being shown in elevation and illustrating the jaws in their collapsed position for lowering into the well.

Fig. 3 is a view similar to Fig. 2 showing certain of the upper parts in elevation and with the jaws expanded.

Fig. 4 is a vertical detail on the line 4—4 of Fig. 2 in the direction of the arrows, showing the pivotal mounting of the jaws.

Fig. 5 is a sectional view similar to Figs. 2 and 3 with certain of the upper parts in elevation showing a fish gripped by the jaws.

Fig. 6 is a partial vertical section on an enlarged scale through the movable valve casing.

Fig. 7 is a detail transverse section on the line 7—7 of Fig. 5 in the direction of the arrows.

Fig. 8 is a vertical section and partial elevation of an alternative construction showing the jaws in an expanded position.

Fig. 9 is a view similar to Fig. 8 showing the jaws contracted.

Referring first to the construction of Figs. 1 through 7, the slushing fluid pipes are indicated by the numeral 11, these being utilized to lower the fishing tool into a well, such slushing pipes being supported for rotation in the ordinary manner. The lower end of these pipes is connected to a coupling 12 and this coupling is connected to a telescopic coupling designated generally by the numeral 13, this latter coupling having an outer cylindrical member 14 with a cap 15 at the top connected to the coupling 12 and shoulders 16 at the bottom. The inner telescopic member 17 has a head 18 with a packing 19 preventing leakage between the shank 20 and the passage through the shoulder 16. This shank is made square, and it terminates in a pin 21 which is connected to a box 22. Below the box there is inserted pipe sections 23 which may be of the number or weight desired to give a sufficient weight on the tool.

A coupling 24 connects to a pipe 25 which forms a compression fluid chamber 26. This pipe is interiorly connected to the threaded upper end 27 of a foot 28, and immediately below the end of the pipe 25 there is a square holed collar 29. The foot has a cylindrical section 30 with a rotatable collar 31 fitted thereon, there being ball bearings 32 between the collar 29 fixed on a squared upper end of the foot and the rotatable collar 31. There is also a second set of ball bearings 33 between the internal coupling end 34 of the rotatable collar and the main portion of the body of the foot 28.

The foot 28 has an interiorly threaded socket 35 and has a longitudinal passage 36 extending vertically through the body of the foot to the compression fluid chamber 26. A shoe plug 37 is exteriorly threaded and adapted to screw to the threads of the socket 35. Extending upwardly from this shoe plug there is a pipe 38 which has a slidable fit in the passage 36 and extends above said passage having an abutment collar 39 secured to the top and limiting the downward movement of the shoe plug by engagement with the threaded upper end of the foot.

A shoe 40 is connected to the shoe plug by an internal fitting 41, and this plug has a series of slots 42 with sockets 43 formed at the top. There is an internal passage 44 through the shoe plug and in alignment therewith an internal passage 45 through the shoe.

A plurality of jaws 46, of which four are indicated, have balls 47 at their upper ends, and downwardly from these balls there are shanks 48 which have a transverse movement in the slots 42. The jaws have an outwardly bowed section 49 and gripping ends 50. Attached to each of the jaws there is a lug 51 and toggle links or levers 52 are pivotally connected to these lugs, the inner ends of the toggle links being connected to a ring 53.

A valve casing 54 is slidably mounted in the pipe 38 (note particularly Fig. 6). The valve casing has an internally attached head 55 with a port 56 therethrough and a valve seat 57 on the inner part of the head. The base 58 of the valve casing has a rod 59 connected thereto, such rod being attached to the ring 53. There are ports 60 through the base of the valve casing. A valve plug 61 has a conical face to seat on the valve seat 57 and is provided with a stem 62 with a head 63, to which is attached a spring 64, the upper end of the spring being connected to a pin 65, or the like, attached to the abutment collar 39.

A cylindrical sleeve 66 is secured by an internal screw-threaded connection 67 to the lower part 34 of the rotatable collar 31. This sleeve has a turning fit on the foot 28 and on the shoe 40, but does not contact with the lower part of the shoe plug. The interior lower end of the sleeve engages the outer surface of the bowed sections of the jaws 49, as indicated in Fig. 5.

The manner of operation and functioning of my fishing tool, as above described, is substantially as follows:

In the normal condition of lowering the fishing tool into the well, the telescopic coupling is fully extended, that is, with the inner telescopic member 17 lowered in the upper member 14 to its full extent, and the weight of the tool being carried on the shoulder 16. The tool is lowered into the well with the shoe plug 37 screwed out of the socket 35 to a considerable extent, as illustrated in Fig. 2, and with the sleeve 66 in an upper position on the shoe 40. The spring 64 exerts an upward pull on the valve casing 54 and through the medium of the rod 59 draws upwardly on the toggle links or levers 52, hence pulling the jaws into the collapsed position, as shown in Fig. 2.

When the fishing tool is introduced into the well and touches the bottom, the supporting pipes are lowered slightly relative to the lower end of the tool so that the telescopic coupling is somewhat contracted, as shown in Fig. 3. This takes the weight of all the supporting rods or pipes off the jaws. It is intended when the jaws reach the bottom of the well that a slushing fluid be forced down through the supporting pipes, flowing into the compression fluid chamber 26, and from this passing down the pipe 38. The initial action of the slushing fluid is to bodily move the valve casing 54 downwardly, and in such action the rod 59 is shifted down and causes the spreading of the toggle links 52, and thus expands the jaws into the position shown in Fig. 3.

When the jaws are fully expanded, the pressure of the slushing fluid shifts the valve plug 61 downwardly away from the seat 57, allowing passage of slushing fluid through the inlet port 56 into the valve casing 54, and out of the discharge ports 60, such slushing fluid then passing down through the passages 44 and 45, and flows around the jaws 56. This action keeps muck, sand, etc., clear of the jaws and allows them to contact with a fish to be lifted.

When it is judged that a fish has been gripped, the supporting pipes are rotated in a direction to tighten instead of unloosening the couplings, this usually being a right-handed rotation, and by means of the squared telescopic member 17, rotation is communicated to the pipe 25, and by this pipe to the foot 28, the fixed collar 29 rotating with the foot on account of the squared connection therewith. The rotating action draws the shoe plug 37 upwardly into the socket 35 on account of the screw-threaded connection, thus raising the shoe 40 relative to the sleeve 66, which sleeve is attached to the collar 31 which is rotatable on the cylindrical section 30 of the foot and between the foot and the fixed collar 29, on account of the ball bearings. This upward movement of the shoe plug is continued until the lower interior part of the sleeve 66 engages the shanks 48 and the bowed section 49 of the jaws 46, forcing these inwardly and gripping the fish, as shown in Fig. 5. When firmly gripped, the fish may be drawn to the surface of the well by elevating the fishing tool in the usual manner. It will be noted that when the jaws are forced inwardly, the valve casing is forced upwardly, but the slushing fluid may still be forced through the valve casing if desired.

In Figs. 8 and 9 I show a modified construction in which a shoe 70, which has an interior screw-threaded connection with the shoe plug 37, is provided with slots 71 in which are mounted the jaws 72 on transverse pintles 73. The jaws are provided with cam humps 74 on the outer side and the inner edges 75 provide gripping edges.

The rod 59 is provided with a cam-shaped head 76 which engages inwardly extending fingers 77 connected to the jaws, the fingers and the jaws forming a species of bell crank.

In the operation of the construction of Figs. 8 and 9 the fishing tool may be introduced in the well with the jaws collapsed, the valve casing being in its upper position and the sleeve 66 also being in an upper position, the shoe plug 37 being in its lowermost position in reference to the socket 35 of the foot 28. After the tool has reached the bottom of the well and it is desired to open or spread the jaws apart, the slushing fluid is forced through the fishing tool, driving the valve casing downwardly, which action causes the cam head 76 to press downwardly on the fingers 71, as shown in Fig. 8, and thus tilt the jaws outwardly. In this action the slushing fluid may pass downwardly through the valve casing, keeping the jaws clean.

When it is desired to grip the fish, the tool is rotated in the manner above described in connection with Figs. 1 through 7, this forcing the sleeve 66 downwardly so that its lower edge presses on the cam hump 74 and forces the jaws inwardly, as shown in Fig. 9, holding such jaws in an inward position. At the same time the head 76 is forced upwardly, thereby elevating the valve casing; but if desired, the slushing fluid may still be forced through the valve casing and around the jaws.

From the above description, together with the drawings, it will be seen that I have developed a comprehensive fishing tool which may be introduced into a well in a collapsed position, and by means of the slushing fluid, the jaws may be expanded for gripping a fish when adjacent the bottom of the well; and that when the supporting pipes are rotated, thereby rotating most of the structure of the fishing tool, the jaws, as they grip the fish, being held stationary, cause a collapsing or gripping movement of the jaws on the fish, due to the pressure of the sleeve thrusting downwardly and inwardly on the back of the jaws. This rotating action may be continued until the fish is firmly gripped by the jaws and then the fish elevated to the top of the well.

Various changes may be made in the principles of my invention without departing from the spirit thereof, as set forth in the description, drawings and claims.

I claim:

1. A fishing tool having a supporting structure with expandible and contractable fish engaging members, means to introduce said members into a well in their contracted position, hydraulically operated means for expanding said fish engaging members when in the well, and nonhydraulic mechanical or rotatable means for forcibly contracting said members and retaining said members contracted upon a fish.

2. A fishing tool, as claimed in claim 1, the contracting means comprising a relatively stationary structure connected to the fish engaging members, and a rotatable structure connected to the supporting structure and operating directly on the fish engaging member.

3. A fishing tool having a supporting structure with expandible and contractable fish engaging jaws, means to introduce said jaws into a well in a contracted position, means operable from the top of the well to expand said jaws when in the well, and rotatable means operated from the top of the well acting directly on the jaws to forcibly contract and maintain said jaws contracted on a fish.

4. A fishing tool having a supporting structure with pivotally mounted expandible and contractable jaws, means to introduce said jaws into a well in contracted position, hydraulically operated means for expanding said jaws when in the well, and nonhydraulic mechanical rotatable means for contracting said jaws upon a fish.

5. A fishing tool having a supporting structure with pivotally mounted jaws connected thereto, means to introduce said jaws into a well in a contracted position, means operable from the top of the well for expanding said jaws in the well, a relatively stationary device connected to the jaws and a relatively rotatable device connected to the supporting structure, the rotation of the supporting structure operating means for contracting the jaws upon a fish.

6. A fishing tool comprising in combination a string of supporting pipes, a telescopic coupling connected thereto, a pipe having a fluid chamber below the coupling, a foot connected to said pipe and having a passage therethrough, a shoe, means connecting said shoe to the foot, a plurality of jaws connected to the shoe, means operable through the said passage in the foot and connected to the jaws to retain said jaws in collapsed position for introduction into a well, hydraulic means in the said passage to expand the jaws in the well, rotatable means to shift the shoe relative to the foot, and, in co-operation therewith, means to engage the jaws and forcibly contract same on a fish.

7. A fishing tool comprising in combination a supporting structure having a foot connected thereto with a passage therethrough, a shoe, means forming a threaded connection between the shoe and the foot, a plurality of jaws connected to the shoe, means operable in said passage and connected to the jaws to hold the jaws retracted in lowering into a well, hydraulically operated means in the passage to expand the jaws after lowering into a well, and a sleeve rotatable on the foot and slidable on the shoe to engage the jaws and retract the jaws on a relative turning movement of the foot and the shoe.

8. A fishing tool comprising in combination a supporting structure, a foot connected thereto, a shoe having a shoe plug, the plug and the foot having a threaded connection, the shoe plug and foot having a passage therethrough, a plurality of jaws pivotally connected to the shoe, a rod in the said passage and operatively connected to the jaws, a spring operably connected to the rod to retract the jaws for lowering into a well, hydraulically operated means in the passage and connected to the rod to expand the jaws, a sleeve rotatable on the foot and slidable on the shoe to engage the jaws and contract them on a turning movement of the foot relative to the shoe.

9. A fishing tool, as claimed in claim 8, the hydraulically operated means comprising a valve casing having ports at the upper and lower ends, the lower end of the casing being connected to the rod, a valve plug forming a closure for the upper port, said port being connected to the spring.

10. A fishing tool having in combination a string of pipe, a telescopic coupling depending therefrom constructed to transmit turning motion, a foot supported below said coupling and having a passage therethrough, a shoe having a shoe plug, said plug having a threaded connection with the foot, a plurality of jaws pivotally connected to the shoe, means operable in said passage and connected to the jaws to maintain the jaws contracted during the lowering into a well, hydraulically operated means in the said passage to expand the jaws when lowered in the well, a sleeve mounted on the foot and the shoe, said sleeve contracting the jaws on the relative rotation of the shoe and the foot.

11. In a fishing tool, a supporting structure, a foot connected thereto having a threaded socket at the bottom, a shoe having a threaded shoe plug, said plug threading into the socket, the shoe, shoe plug and foot having a passage therethrough with a pipe connected to the shoe plug extending through the passage in the foot, a plurality of jaws pivotally connected to the shoe, a valve casing in the said pipe having a connection from its lower end to the jaws, ports in the upper and lower ends of the valve casing, a valve plug forming a closure for the upper port, a retracting spring connected to the valve plug and to the said pipe and operable to contract the jaws for lowering into a well, the said valve casing being bodily movable downwardly due to downward pressure of a slushing fluid and operable to expand the jaws, and means actuated on the rotation of the foot relative to the sleeve to contract the jaws.

12. In a fishing tool, as claimed in claim 11, the means to contract the jaws comprising a fixed collar on the foot, a rotatable collar mounted on the foot, a sleeve connected to the rotatable collar, said sleeve being slidable on the outside of the shoe and engaging the jaws and contracting the jaws on the rotation of the foot relative to the shoe.

13. In a fishing tool, a supporting structure having a pipe forming a compression fluid chamber, a foot connected to the pipe and having a threaded socket, a shoe having a threaded shoe plug fitting in the socket, a plurality of jaws pivotally connected to the shoe, there being a passage through the shoe, the shoe plug and the foot, with a small pipe connected to the shoe plug and extending through the said passage in the foot to the compression fluid chamber, a valve casing slidably mounted in the small pipe, a rod connected to the lower end of said casing and operatively connected to the jaws, ports through the top and bottom of the valve casing, a valve plug for the upper port, a spring connecting the valve plug and the top of the small pipe, a sleeve mounted on the foot and rotatable thereon and slidable over the shoe, said sleeve engaging the jaws and contracting said jaws on the relative rotation of the foot and the shoe.

14. In a fishing tool, as claimed in claim 13, the mounting of the sleeve comprising a fixed collar on the foot, a rotatable collar on the foot, there being antifriction bearings between the fixed and rotatable collars and the rotatable collar and the foot, the said sleeve being connected to the rotatable collar.

15. In a fishing tool, as claimed in claim 13, a telescopic coupling connected to the pipe forming a compression fluid chamber, said coupling having an outer member and an inner member, said members having a rotation transmitting connection.

In testimony whereof I have signed my name to this specification.

BERTEL M. JENSEN.